A. P. CRELL.
REVERSING MECHANISM.
APPLICATION FILED OCT. 28, 1907.
No. 900,832. Patented Oct. 13, 1908.
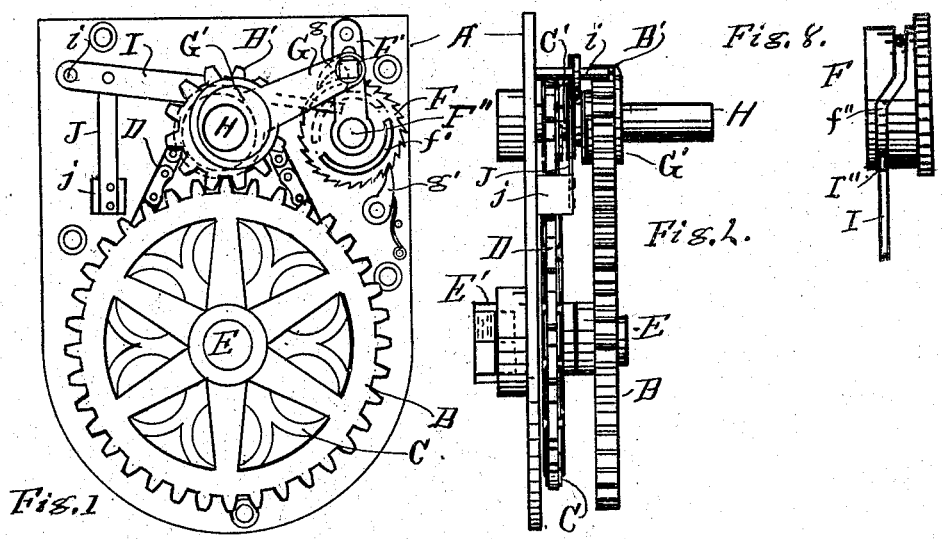
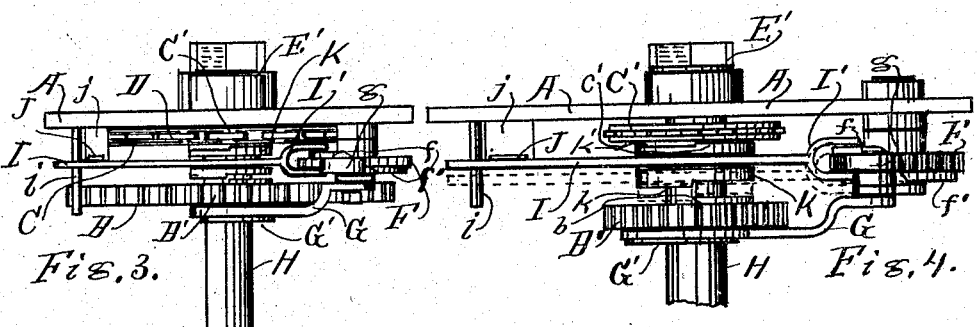
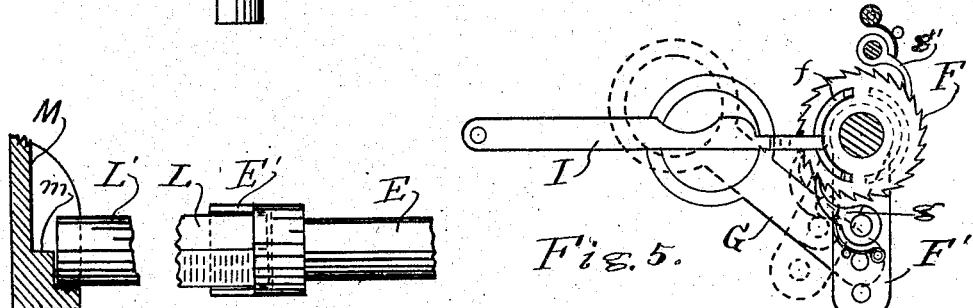
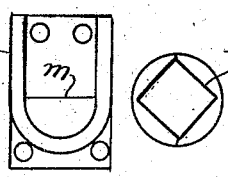
Witnesses
H. L. Boyle
Cecil Cilley.
Inventor
Albert P. Crell,
By Ichriel J. Cilley
Attorney

UNITED STATES PATENT OFFICE.

ALBERT P. CRELL, OF IONIA, MICHIGAN.

REVERSING MECHANISM.

No. 900,832.  Specification of Letters Patent.  Patented Oct. 13, 1908.

Application filed October 28, 1907. Serial No. 399,608.

*To all whom it may concern:*

Be it known that I, ALBERT P. CRELL, a citizen of the United States, residing at Ionia, in the county of Kent and State of Michigan, have invented certain new and useful Improvements in Reversing Mechanism, of which the following is a specification.

My invention relates to improvements in reversing mechanism, and its object is to provide a neat, compact, and practically inexpensive and noiseless reversing mechanism for use upon washing machines and kindred machines where a reversing device is desirable. I attain this object by the mechanism illustrated in the accompanying drawing in which Figure 1 is a side elevation of the device. Fig. 2 is an edge elevation. Fig. 3 is a top plan of Fig. 1, with all parts in place. Fig. 4 is an enlargement of the same with the large gear wheel and sprocket wheel removed plainly show the reversing mechanism. Fig. 5 is a back elevation of the ratchet wheel and its actuating levers &c. Fig. 6 shows the manner of inserting a washing machine shaft. Fig. 7 shows end views of the shaft and bearings that support the machine shaft. Fig. 8 is a side view of a ratchet wheel showing a grooved cam to use in lieu of the side lugs shown in Fig. 1.

Similar letters refer to similar parts throughout the several views.

This reversing mechanism consists of a base A which supports the shafts E, H, and F''. H is the main driving shaft and has, loosely mounted upon it, a small gear wheel B' and a small sprocket wheel C', and between these wheels is a clutch K, also mounted upon the shaft H, that is, so mounted that it must revolve with the shaft, but longitudinally adjustable thereon so that when thrown to the right in Fig. 2, downward on Figs. 3 and 4, the lug k thereon will engage the lug b on the gear wheel B' and cause the gear wheel to revolve with the shaft H, and if the clutch K is thrown over to the left, as shown in Fig. 2, equivalent to being raised upward in Figs. 3 and 4 the lug k', on the clutch, will engage the lug c' on the sprocket wheel C' and cause the wheel to revolve with the shaft H.

The shaft E carries a large sprocket wheel C that is connected with the small sprocket wheel C' by a sprocket chain D, so that the sprocket wheel C, when driven by the sprocket wheel C' must revolve the same direction that the shaft H is revolving. The shaft E also carries a large gear wheel B that meshes directly with the small gear wheel B' so that when the clutch K engages the gear wheel B' the shaft E must revolve in a direction opposite to that in which the gear wheel B' and the shaft H is revolving, thus, by the alternate engagement of the gear wheel B' and the sprocket wheel C' by the clutch K the shaft E will be made to revolve alternately, first to the right and then to the left, with the shaft H always revolving in one direction.

My appliance for sliding the clutch K lengthwise of the shaft H to alternately engage the gear wheel B' and the sprocket wheel C' consists of a ratchet wheel F mounted to revolve freely on the shaft or post F'' and having a lug f on one side, and a lug f' on the other side diametrically opposite the lug f. This ratchet wheel is made to revolve, intermittently, by means of a pawl g pivotally mounted on the arm F' which, in turn, is mounted on the shaft or post F'' and is made to oscillate by means of the eccentric arm G pivoted at one end to the arm F' and the other end engaging the eccentric G' on the shaft H so that every revolution of the shaft H will cause the ratchet wheel F to revolve a short distance where it will be held by the pawl g' until again moved by the eccentric G', as hereinbefore stated. I then mount a lever I, having forks I' at one end, upon a supporting pin i in position so that the body of the lever will engage a groove in the periphery of the clutch K and the forks I' will stand one each side of the ratchet wheel F, so that as the ratchet wheel is made to revolve the lug f will throw the lever to position to cause the clutch to engage the sprocket wheel C' during one-half of the revolution of the ratchet wheel F and the lug f' will engage the other tine of the fork I' and carry the lever over so that the clutch will engage the gear wheel B' during the other half of the revolution of the ratchet wheel, thus alternately engaging the gear wheel B' and the sprocket wheel C', as and with the results hereinbefore mentioned. I hold the back end of the lever I to place so that it may be readily adjusted to follow the direction given the forked end I', by means of a light flexible spring J, mounted upon a post j, as indicated in the first four figures of the drawing.

In Fig. 6 I have shown a very available means for coupling in and supporting the shaft L that is supposed to support the mechanism to be driven and reversed by the reversing mechanism, which consists of a socket E′ integral with the shaft E and so constructed that the square end of the shaft L may be placed therein and slid endwise into the completed socket, as indicated by its dotted lines, and the opposite end of the shaft, marked L′, may be supported in the bearing M in which a step m is formed so that this end of the shaft may be raised a little and the shaft drawn endwise out of the socket E′ and easily removed.

In Fig. 8 I have shown the ratchet wheel F with an extended cylindrical body having an irregular groove f″ in its periphery showing how this construction may be used in lieu of the lugs shown in Figs. 1, 2, 3 and 4, by placing a roller I″ upon the lever I, instead of the forks I′.

Having thus fully described my invention, what I claim as new and desire to secure by Letters Patent of the United States, is:

1. In a reversing mechanism, a base, a driving shaft and a driven shaft supported in said base, a small gear wheel and a small sprocket wheel mounted to revolve freely on the driving shaft, a clutch longitudinally adjustable on the driving shaft between the gear wheel and the sprocket wheel and a lever pivotally mounted at one end upon the base, its center engaging the clutch, and a ratchet wheel formed to engage the free end of the lever and cause it to reciprocate sidewise for adjusting said clutch to alternately engage the gear wheel and the sprocket wheel, a large gear wheel mounted on the driven shaft and directly engaging the small gear wheel, and a large sprocket wheel mounted on the driven shaft and a sprocket chain directly connecting said large sprocket wheel with the small sprocket wheel.

2. In combination, a reversing mechanism consisting of a base, a driving shaft and a driven shaft revolubly mounted on the base, a small gear wheel and a small sprocket wheel revolubly mounted on the driving shaft, and having lugs on their adjacent faces, a clutch mounted on the driving shaft, longitudinally adjustable thereon and having a lug on each side, a ratchet wheel mounted on the base and having a lug on each side diametrically opposite each other, an eccentric rod pivotally connected at one end to the actuating arm, an eccentric mounted on the driving shaft and engaging the other end of the eccentric rod, an actuating pawl on the arm and a retaining pawl on the base adjacent to the ratchet wheel, a lever mounted on the base and having one end bifurcated to pass one fork each side of the ratchet wheel to alternately engage the lugs on this wheel and so connected with the clutch that the revoluble motion of the ratchet wheel will shift the clutch and cause it to engage the lugs on the gear wheel and on the sprocket wheel alternately, a large gear wheel mounted on the driven shaft and directly engaging the small gear wheel, a large sprocket wheel mounted on the driven shaft, and a sprocket chain directly connecting said sprocket wheel with the small sprocket wheel.

3. The combination in a reversing mechanism, of a base, a driving shaft mounted thereon, a small gear wheel and a small sprocket wheel revolubly mounted on said shaft, a clutch mounted on said shaft between the gear wheel and the sprocket wheel and longitudinally adjustable on the shaft, a ratchet wheel mounted on the base and having a lug on each side diametrically opposite each other, an eccentric, eccentric rod and pawl mounted to actuate the ratchet wheel, a pin mounted on the base, a lever slidingly mounted on said pin, a spring supporting one end of said lever, said lever passing over and engaging the clutch with the end bifurcated to engage each side of the ratchet wheel to actuate the clutch to engage the gear wheel and the sprocket wheel alternately, a driven shaft mounted on the base, a large gear wheel mounted on said shaft and directly connected with the small gear wheel, a large sprocket wheel mounted on the driven shaft, and a chain directly connecting the large and the small sprocket wheels.

Signed at Ionia Michigan October 18, 1907.

ALBERT P. CRELL.

In presence of—
A. C. COLVIN,
H. S. UDELL.